(12) United States Patent
Burdick

(10) Patent No.: US 9,558,636 B1
(45) Date of Patent: Jan. 31, 2017

(54) AUTOMATIC TELLER MACHINE INVENTORY AND DISTRIBUTION SYSTEM

(71) Applicant: Jonathan Ralph Burdick, St. Louis, MO (US)

(72) Inventor: Jonathan Ralph Burdick, St. Louis, MO (US)

(73) Assignee: Uniloc Luxembourg S.A., Luxembourg (LU)

( * ) Notice: Subject to any disclaimer, the term of this patent is extended or adjusted under 35 U.S.C. 154(b) by 17 days.

(21) Appl. No.: 14/867,976

(22) Filed: Sep. 28, 2015

(51) Int. Cl.
G07F 19/00 (2006.01)
H04W 12/06 (2009.01)
H04L 9/32 (2006.01)

(52) U.S. Cl.
CPC .......... *G07F 19/209* (2013.01); *G07F 19/203* (2013.01); *H04L 9/3271* (2013.01); *H04W 12/06* (2013.01)

(58) Field of Classification Search
CPC ..... G07F 19/203; G07F 19/209; H04W 12/06; H04L 9/3271
See application file for complete search history.

(56) References Cited

U.S. PATENT DOCUMENTS

| | | | |
|---|---|---|---|
| 2011/0191243 A1* | 8/2011 | Allen | G06Q 10/06315 705/43 |
| 2013/0124855 A1* | 5/2013 | Varadarajan | G06Q 20/3276 713/155 |
| 2016/0078416 A1* | 3/2016 | DeLuca | G06Q 20/1085 705/43 |
| 2016/0086143 A1* | 3/2016 | Hao | G06Q 20/1085 705/43 |

* cited by examiner

*Primary Examiner* — Robert Leung
(74) *Attorney, Agent, or Firm* — Sean D. Burdick

(57) ABSTRACT

A bank server allows a user of one ATM to reserve cash at another, nearby ATM when the first ATM has an inadequate cash inventory to serve the user's requested transaction. The user attempts to withdraw cash from the first ATM, but the first ATM has insufficient cash to perform the withdrawal transaction. Through the first ATM, the bank server offers the user a cash reservation at the other ATM. The bank server causes the other ATM to reserve a requested amount of cash for the user, possibly refusing to dispense cash to other users if doing so would leave the other ATM with insufficient cash to dispense the reserved cash. The user travels a short distance to the other ATM and withdraws the reserved cash. In effect, the other ATM can now perform the withdrawal transaction requested of the first ATM when the first ATM couldn't.

15 Claims, 9 Drawing Sheets

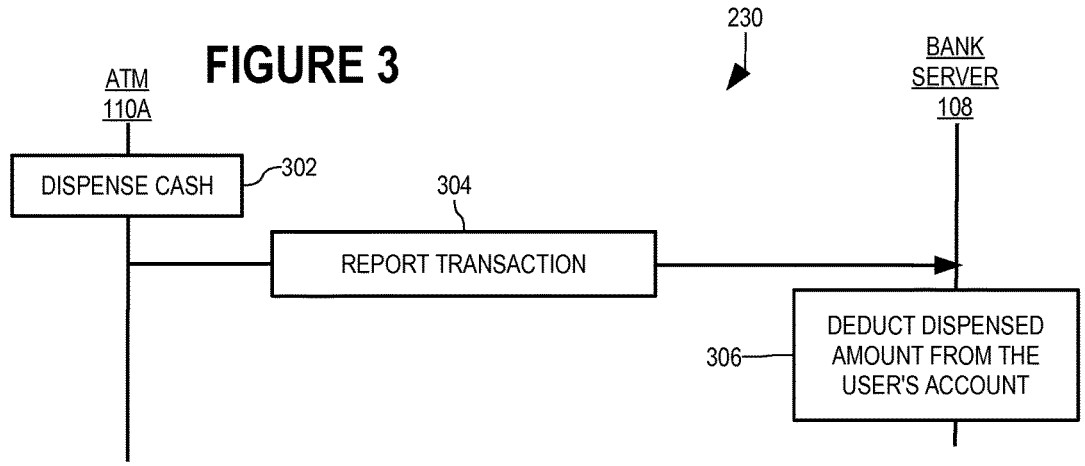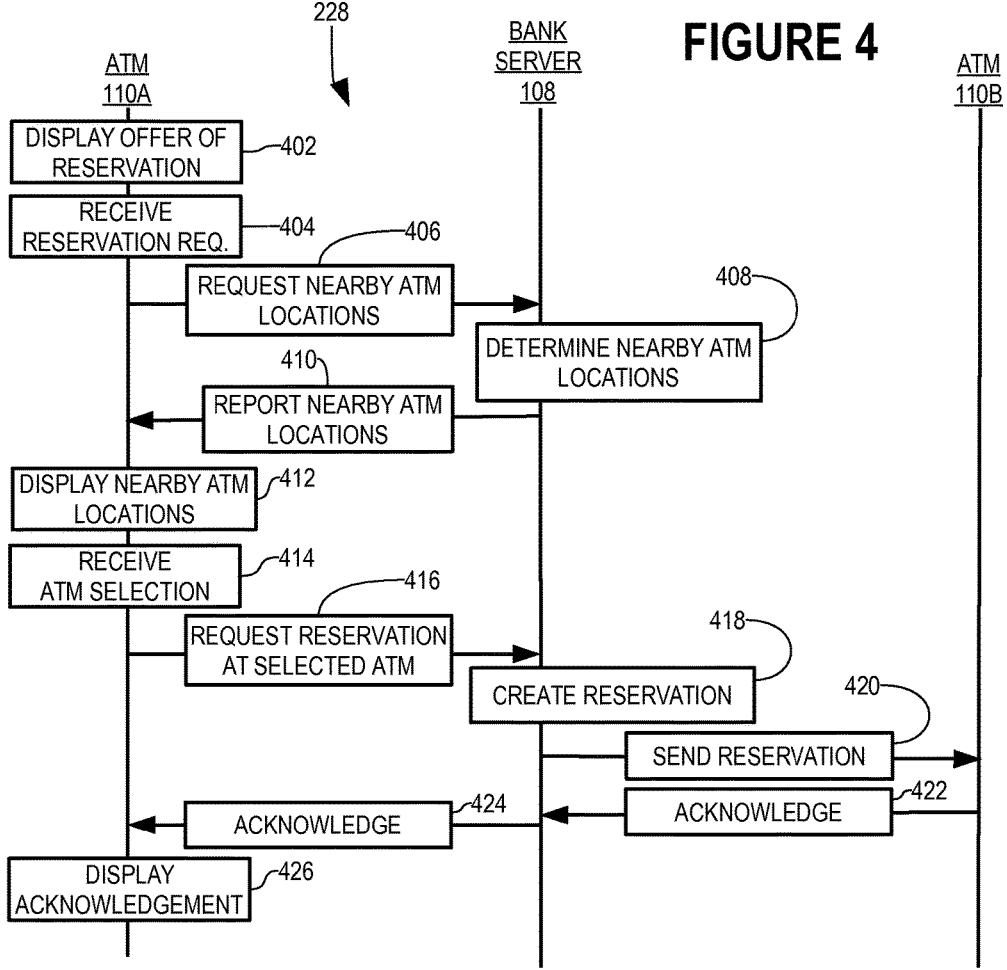

AUTOMATIC TELLER MACHINE INVENTORY AND DISTRIBUTION SYSTEM

BACKGROUND OF THE INVENTION

Field of the Invention

The present invention relates generally to automatic teller machines (ATMs) and, more particularly, methods of and systems for improving cash availability at ATMs.

Description of the Related Art

Prior to the introduction of ATM technology, bank customers physically visited any branch of their bank and withdrew cash from a human teller. With very few exceptions in times of financial catastrophe, the bank branches always had plenty of cash on hand to meet their customers' needs.

Since the introduction of ATMs, cash availability has become nearly ubiquitous. And bank customers have come to expect cash to be available nearly everywhere. However, this wide distribution of cash in numerous ATMs represents a risk of loss. While a bank can fortify a brick and mortar bank branch, ATMs can be found in many places that banks can't fortify, such as gas stations, restaurants, hotels, amusement parks, grocery stores, etc. operated by others, who also provide for whatever security there is. While the ATMs themselves can provide their own security by making it extremely difficult to extract cash without proper authorization and access, ATMs can be small enough to be driven off in a standard pick-up truck or station wagon.

Accordingly, it is preferred to stock ATMs with just enough cash to meet the expected demand. Any excess cash stocked in an ATM represents a risk of loss.

At the same time, it is important that ATMs do not run out of cash to dispense. For the customer, this represents a significant inconvenience, particularly if the customer is unfamiliar with the area and doesn't know the location of nearby ATMs. In addition, the business providing the ATM for its customers loses income when the ATM is unable to dispense cash—both in terms of fees paid by the customer for cash access and in terms of incidental business with the customer, such as impulse purchases while the customer is visit the business.

What is needed is a way to increase cash availability while avoiding overstocking ATMs with cash.

SUMMARY OF THE INVENTION

In accordance with the present invention, a bank server allows a user of one ATM to reserve cash at another, nearby ATM when the first ATM has an inadequate cash inventory to serve the user's requested transaction. As used herein, an automatic teller machine (ATM) is any device that can withdraw funds from a bank account as dispensed cash. The user attempts to withdraw cash from the first ATM, but the first ATM has insufficient cash inventory to perform the withdrawal transaction. Through the first ATM, the bank server offers the user a cash reservation at the other, nearby ATM. The bank server causes the other ATM to reserve a requested amount of cash for the user, possibly refusing to dispense cash to other users if doing so would leave the other ATM with insufficient cash to dispense the reserved cash. The user travels a presumably short distance to the other ATM and withdraws the reserved cash. In effect, the other ATM can now perform the withdrawal transaction requested of the first ATM when the first ATM is unable to perform the withdrawal transaction.

Such allows ATMs to be stocked with relatively low levels of cash for added security with only minimal impact on the convenience of the bank's customers. While ATM cash inventories are conventionally considered isolated resources, allowing one ATM to perform a withdrawal transaction requested of another ATM converts cash inventories of ATMs from isolated resources to a regionally distributed resource. In addition, ATM operators are now motivated to increase cash inventories in ATMs since processing reservations of insufficiently stocked ATMs brings business, both in terms of ATM fees and walk-in customers that otherwise would not have visited the business within which the well-stocked ATM is located.

When the bank server receives a request to reserve cash on behalf of the user, the bank server identifies a number of ATMs in relatively close proximity to the first ATM with sufficient cash inventories to perform the requested withdrawal transaction. The bank server reports the identified ATMs and their respective locations to the first ATM.

The first ATM reports the identified nearby ATMs and their respective locations to the user, e.g., as a displayed map with locations marked on the map or, particularly in the case of visually impaired users, an audio signal speaking the locations of the identified ATMs. The user selects a nearby ATM at which cash is to be reserved for the user. The first ATM reports the selected nearby ATM selected by the user to the bank server.

In response, the bank server reports the reservation to the selected ATM, identifying the user for whom the cash is to be reserved and the amount of cash to reserve. The selected ATM reserves the cash for the user by refusing to complete any cash withdrawal transactions that would leave the selected ATM with an insufficient cash inventor to dispense the reserved amount of cash to the user. Thus, the selected ATM reserves the cash for the user who can then travel a presumably short distance to complete the cash withdrawal that the first ATM could not complete.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

FIGS. 3-5 are each a transaction flow diagram illustrating a step of the transaction flow diagram of FIG. 2 in greater detail.

DETAILED DESCRIPTION

Figure 1:
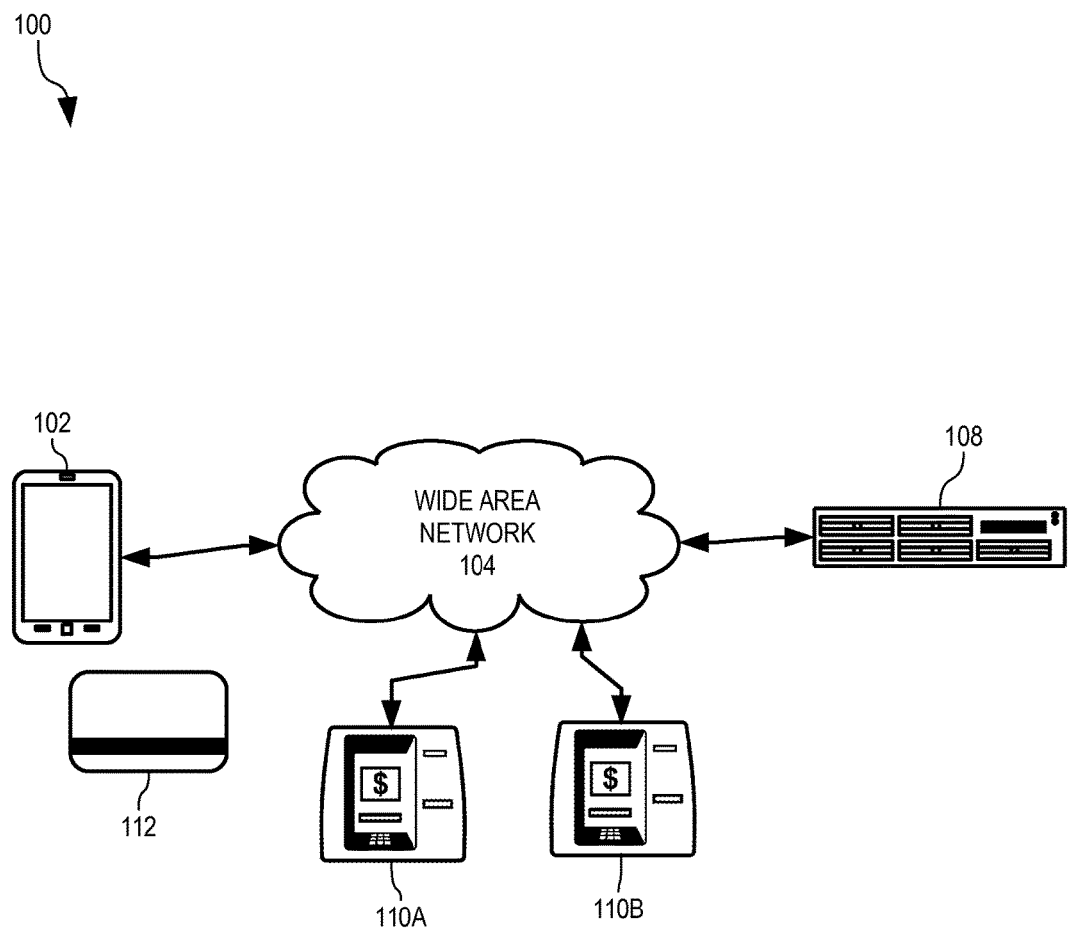
FIG. 1 is a diagram showing a number of ATMs coupled through a wide area network and therethrough to a bank server in accordance with one embodiment of the present invention.

In accordance with the present invention, a bank server 108 (FIG. 1) allows a user of one of ATMs 110A-B to reserve cash at a nearby one of ATMs 110A-B when the first ATM has inadequate cash to serve the user's requested transaction. ATMs 110A-B communicate with bank server 108 through a wide area network 104. While only two ATMs 110A-B are shown, it should be appreciated that many, many more ATMs can be used in the manner described herein. ATMs 110A-B are directly analogous to one another and any description of either herein is equally applicable to the other.

Briefly, in a process that is described in greater detail below, a user attempts to withdraw cash from ATM 110A but ATM 110A has insufficient cash on hand to perform the withdrawal transaction. Through ATM 110A, bank server 108 offers the user a cash reservation at nearby ATM 110B. Bank server 108 causes ATM 110B to reserve a requested amount of cash for the user, possibly refusing to dispense cash to other users if doing so would leave ATM 110B with insufficient cash to dispense the reserved cash. The user travels a presumably short distance to ATM 110B and withdraws the reserved cash. In effect, ATM 110B can now perform the withdrawal transaction requested of ATM 110A when ATM 110A is unable to perform the withdrawal transaction.

Such allows ATMs to be stocked with relatively low levels of cash for added security with only minimal impact on the convenience of the bank's customers. While ATM cash inventories are conventionally considered isolated resources, allowing one ATM to perform a withdrawal transaction requested of another ATM converts cash inventories of ATMs from isolated resources to a regionally distributed resource. In addition, ATM operators are now motivated to increase cash inventories in ATMs since processing reservations of insufficiently stocked ATMs brings business, both in terms of ATM fees and walk-in customers that otherwise would not have visited the business within which the well-stocked ATM is located.

Transaction diagram 200 (FIG. 2) shows a transaction between ATM 110A and bank server 108. In step 202, ATM 110A receives authentication data from the user of a mobile computing device 102 (FIG. 1) or an ATM card 112. In one embodiment, the user inserts ATM card 112 into ATM 110A, which then reads data identifying the user from a magnetic strip on ATM card 112, and the user enters a personal identification number (PIN) using conventional user interface techniques. In another embodiment, the user operates mobile computing device 102 to communicate with ATM 110A to authenticate the user.

In step 204 (FIG. 2), ATM 110A sends the authentication data to bank server 108. In step 206, bank server 108 authenticates the user.

Bank server 108 stores a user record 600 (FIG. 6) that represents the user. User identifier 602 includes data that uniquely identifies the user within bank server 108. ATM card number 604 includes data that identifies ATM card 112 (FIG. 1). PIN 606 (FIG. 6) includes data that represents the user's personal identification number that is associated with ATM card 112 (FIG. 1). If the user uses ATM card 112 for authentication, bank server 108 authenticates the user if the data read from the magnetic strip matches ATM card number 604 (FIG. 6) and the PIN entered by the user matches PIN 606.

Mobile computing device information 608 includes data unique to mobile computing device 102 (FIG. 1) and is used in a manner described below to authenticate mobile computing device 102 and, by association within user record 600 (FIG. 6), the user.

User record 600 includes one or more account records 610, each of which includes an identifier 612 and a balance 614. Identifier 612 includes data that identifies a bank account of the user uniquely within bank server 108. Balance 614 includes data that represents the monetary balance of the identified bank account.

Returning to transaction flow diagram 200 (FIG. 2), bank server 108 sends the results of authentication of step 206 to ATM 110A in step 208. If the user was successfully authenticated, processing by ATM 110A transfers to test step 210. Otherwise, if the user was not successfully authenticated in step 206, processing according to transaction flow diagram 200 terminates. The user can start a new session to reattempt authentication.

In test step 210, ATM 110A determines whether ATM 110A has a cash reservation for the user. If so, ATM 110A processes the reservation in step 212. Both steps 210 and 212 are described in greater detail below.

If no cash reservation exists for the user, ATM 110A transfers processing from test step 210 to step 214, in which ATM 110A receives a request for a cash withdrawal from the user. The user generates the request using conventional user interface techniques. The request includes both a cash amount to withdraw and data identifying an account of the user.

In step 216, ATM 110A sends a balance inquiry to bank server 108. The balance inquiry identifies the user and the account from which funds are to be withdrawn and can also include the requested amount to withdraw.

In step 218, bank server 108 determines the available balance in the identified account of the user. In particular, bank server 108 retrieves balance 614 (FIG. 6) of the particular account 610 of the user that has the particular identifier 612 of the one included in the balance inquiry.

In step 220 (FIG. 2), bank server 108 sends a report of the balance available for the identified bank account of the user. If the balance inquiry includes a requested withdrawal amount, bank server 108 can compare the requested amount to the balance of the identified account in step 218 and merely report whether the withdrawal is approved in step 220.

In test step 222, ATM 110A determines whether the identified account has sufficient funds such that the withdrawal should be approved. If the balance received in step 220 is less than the requested amount of the withdrawal or the response received in step 220 indicates that the withdrawal is denied, ATM 110A reports to the user that she has insufficient funds to complete the withdrawal and the withdrawal transaction is canceled, terminating processing according to transaction flow diagram 200.

Conversely, if the balance received in step 220 is more than the requested amount of the withdrawal or the response received in step 220 indicates that the withdrawal is approved, ATM 110A determines whether ATM 110A has sufficient cash on hand to carry out the withdrawal transaction in test step 226. If ATM 110A does not have sufficient cash on hand to carry out the withdrawal transaction, ATM 110A offers to reserve the requested amount of cash at a nearby ATM in step 228, which is described in greater detail below. Conversely, if ATM 110A does have sufficient cash on hand to carry out the withdrawal transaction, processing by ATM 110A transfers to step 230 in which ATM 110A performs the withdrawal transaction.

Step 230 is shown in greater detail as transaction diagram 230 (FIG. 3). In step 302, ATM 110A dispenses cash in the requested amount to the user. In step 304, ATM 110A reports the completed transaction to bank server 108. The report also includes data representing the amount of remaining cash is currently stocked in ATM 110A. In response, bank server 108 deducts the dispensed amount of cash from the user's bank account and records the amount of cash on hand in ATM 110A in step 306.

After step 306, processing according to transaction flow diagram 230 completes. After step 230 (FIG. 2), processing according to transaction flow diagram 200 completes.

As described above, ATM 110A offers to reserve the requested amount of cash at a nearby ATM in step 228, which is shown in greater detail as transaction flow diagram 228 (FIG. 4). In step 402, ATM 110A displays the offer to the user. In step 404, ATM 110A receives a request to reserve the requested amount of cash at a nearby ATM. The user generates the request using conventional user interface techniques. In one embodiment, the user interface allows the user to reserve an amount of cash different from the amount previously requested. If the user requests reservation of more cash than requested in step 214, ATM 110A ensures that the user's bank account has sufficient funds in the manner described above with respect to steps 216-224 (FIG. 2).

In step 406 (FIG. 4), ATM 110A sends a request for nearby ATM locations to bank server 108. In response, bank server 108 identifies a number of nearby ATMs with sufficient cash to accept the reservation in step 408.

Figure 7:
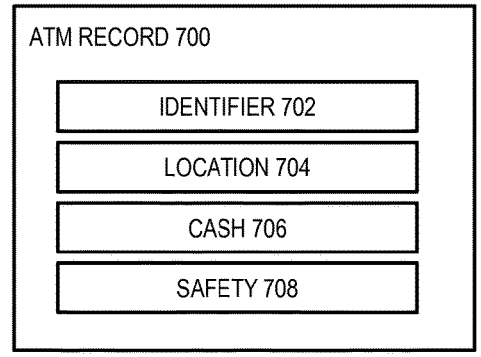
FIG. 7 is a block diagram of an ATM record that the bank server of FIG. 1 uses to coordinate a cash reservation offer and processing of the cash reservation in accordance with one embodiment of the invention.

Bank server 108 stores a number if ATM records such as ATM record 700 (FIG. 7). Identifier 702 uniquely identifies an ATM within bank server 108. Location 704 identifies the location of the ATM and can include any combination of a number of types of location data. For example, location 704 can include latitude and longitude of the ATM, a street address of the ATM, and/or textual data describing the location, such as "In the lobby of the Main Street hotel on the corner of Main Street and 14$^{th}$ Avenue."

Cash 706 includes data specifying the amount of cash currently on hand at the ATM. As described above, each transaction reported in various performances of step 304 (FIG. 3) by various ATMs includes data specifying the remaining cash on hand of the reporting ATM. In step 306, bank server 108 updates cash 706 (FIG. 7) for the ATM record 700 of the reporting ATM.

Safety 708 includes data representing the relative safety of the location of the particular ATM represented by ATM record 700. Bank server 108 periodically retrieves data representing police incident reports from any of a number of publicly available sources and uses that data to evaluate the relative safety of ATMs near the reported incidents.

The relative safety can be evaluated in any of a number of manners. One is to weight each incident according to its proximity to the ATM and its severity and sum the most recent ten (10) weighted incidents. ATMs with nearer and more severe incidents would have higher scores than those with further and less severe incidents. Another is to determine how many incidents have been reported within a predetermined distance of each ATM's location within a predetermined amount of time.

Relative safety can be represented in any of a number of ways in safety 708. In one embodiment, safety 708 includes the raw score of nearby reported incidents just described. In an alternative embodiment, safety 708 includes a normalized score based on that raw data. For example, safety 708 can include a normalized integer crime score in the range of one to ten. Or, safety 708 can invert the crime score to produce a safety score of one to ten. In addition, safety 708 can include data represent each of the incidents in some detail, including location and type of incident that were used in computing the relative safety of the ATM.

In step 408 (FIG. 4), bank server 108 retrieves location 704 (FIG. 7) of the ATM record 700 that represents ATM 110A and finds a predetermined number of the ATM records nearest location 704 by comparing the respective locations of those ATM records. Bank server 108 also uses cash 706 of the ATM records to ensure that only ATMs with sufficient cash to fulfill the withdrawal transaction are selected.

In step 410 (FIG. 4), bank server 108 reports the locations and associated safety data of the nearest ATMs to ATM 110A.

In step 412, ATM 110A displays information regarding the nearest ATMs reported in step 410. In one embodiment, ATM 110A displays a map showing its own location and respective locations and safety of the nearby ATMs. ATM 110A provides a user interface in which the user can request to see more detailed information about selected ones of the nearby ATMs, such as more details regarding the reported incidents near the ATM for example.

In step 414, ATM 110A receives data generated by the user, through the user interface, that identifies a nearby ATM, e.g., ATM 110B, at which the user would like to reserve cash. In step 416, ATM 110A sends a request to reserve cash for the user, specifying the selected ATM, the amount of cash, the user, and the user's bank account from which the withdrawal will be later made.

In step 418, bank server 108 creates the reservation. Reservation record 800 (FIG. 8) represents the reservation. User 802 includes data that identifies the user. Account 804 includes data that identifies the particular bank account of the user from which the cash is to be withdrawn. ATM 806 includes data that identifies the ATM at which the cash is to be reserved. Amount 808 includes data that identifies the amount of cash reserved. Expiration 810 includes data that identifies a time at which the reservation expires. Status 812 includes data that indicates the current status of the subject reservation. Initially, status 812 indicates that the reservation is valid and not yet completed.

In step 420, bank server 108 sends the reservation to ATM 110B. In response, ATM 110B does not complete cash withdrawals that would cause the amount of cash on hand at ATM 110B to be less than the sum of reserved cash of all cash reservations assigned to ATM 110B. In particular, in step 226 (FIG. 2), ATM 110A deducts any reserved cash from the amount of cash on hand in determining whether ATM 110A has sufficient cash to complete the withdrawal transaction.

In step 422, ATM 110B acknowledges the reservation to bank server 108. In step 424, bank server 108 acknowledges the reservation to ATM 110A. In step 426, ATM 110A displays acknowledgement that the reservation has been made and provides information that assists the user in traveling to the nearby ATM. In one embodiment, the information includes walking and/or driving directions to ATM 110B on a paper receipt. In an alternative embodiment, ATM 110A provides a user interface through which the user can enter a mobile telephone number to which the location of ATM 110B can be sent as an SMS message or an e-mail address to which the location of ATM 110B can be sent. In yet another embodiment, mobile computing device information 608 includes a telephone number and/or an e-mail address associated with mobile computing device 102 and ATM 110A (or, alternatively, bank server 108) sends the location of ATM 110B to mobile computing device 102 using that telephone number and/or e-mail address. If the user was authenticated in step 202 using mobile computing device 102, ATM 110A can send the location information to ATM 110A through the communications connection through which the user was authenticated.

After step 426, processing according to transaction flow diagram 228 completes. After step 228 (FIG. 2), processing according to transaction flow diagram 200 completes.

Figure 5:
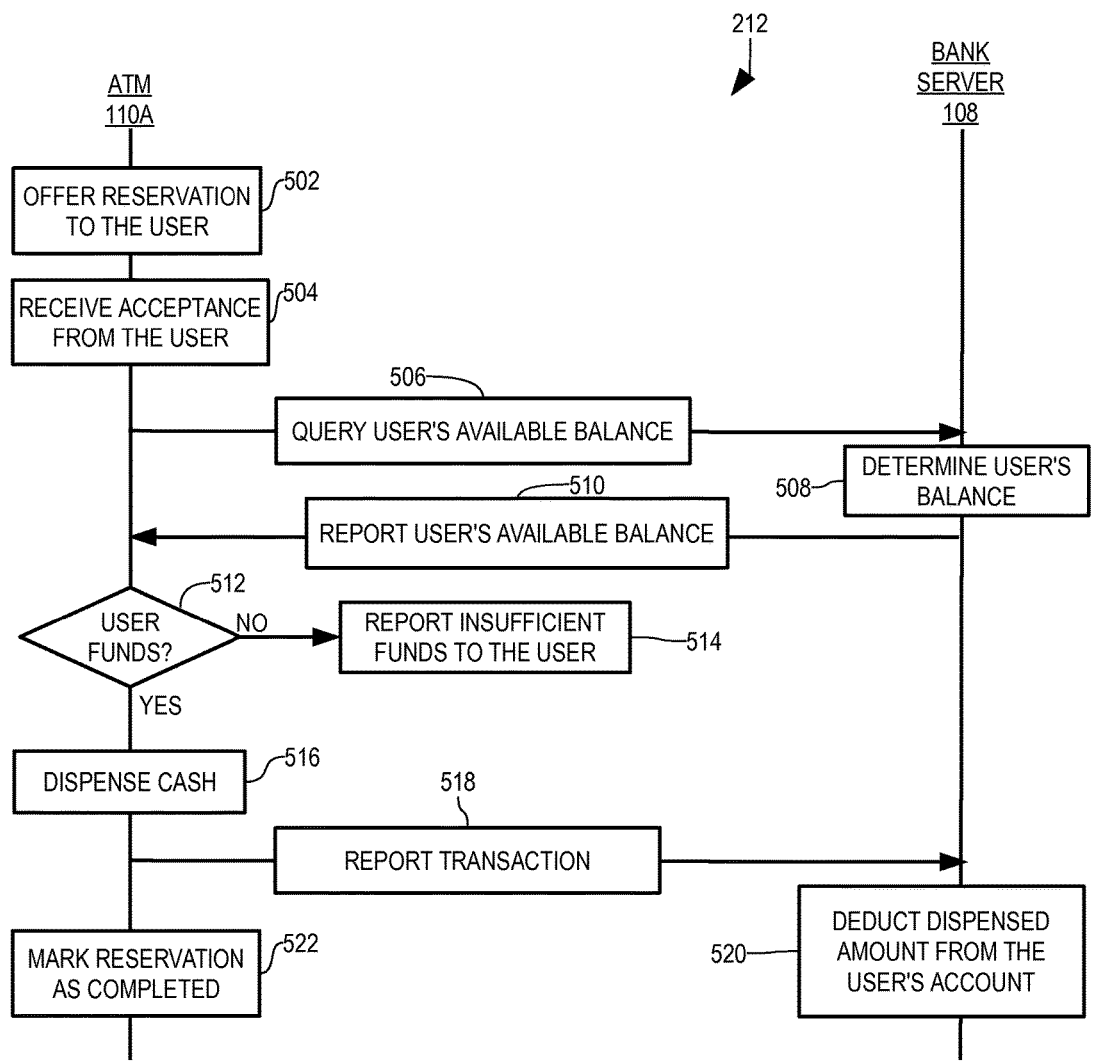

As described above, ATM 110A processes a reservation in step 212 if ATM 110A has a cash reservation for the user. Step 212 is shown in greater detail in transaction flow diagram 212 (FIG. 5).

Figure 2:
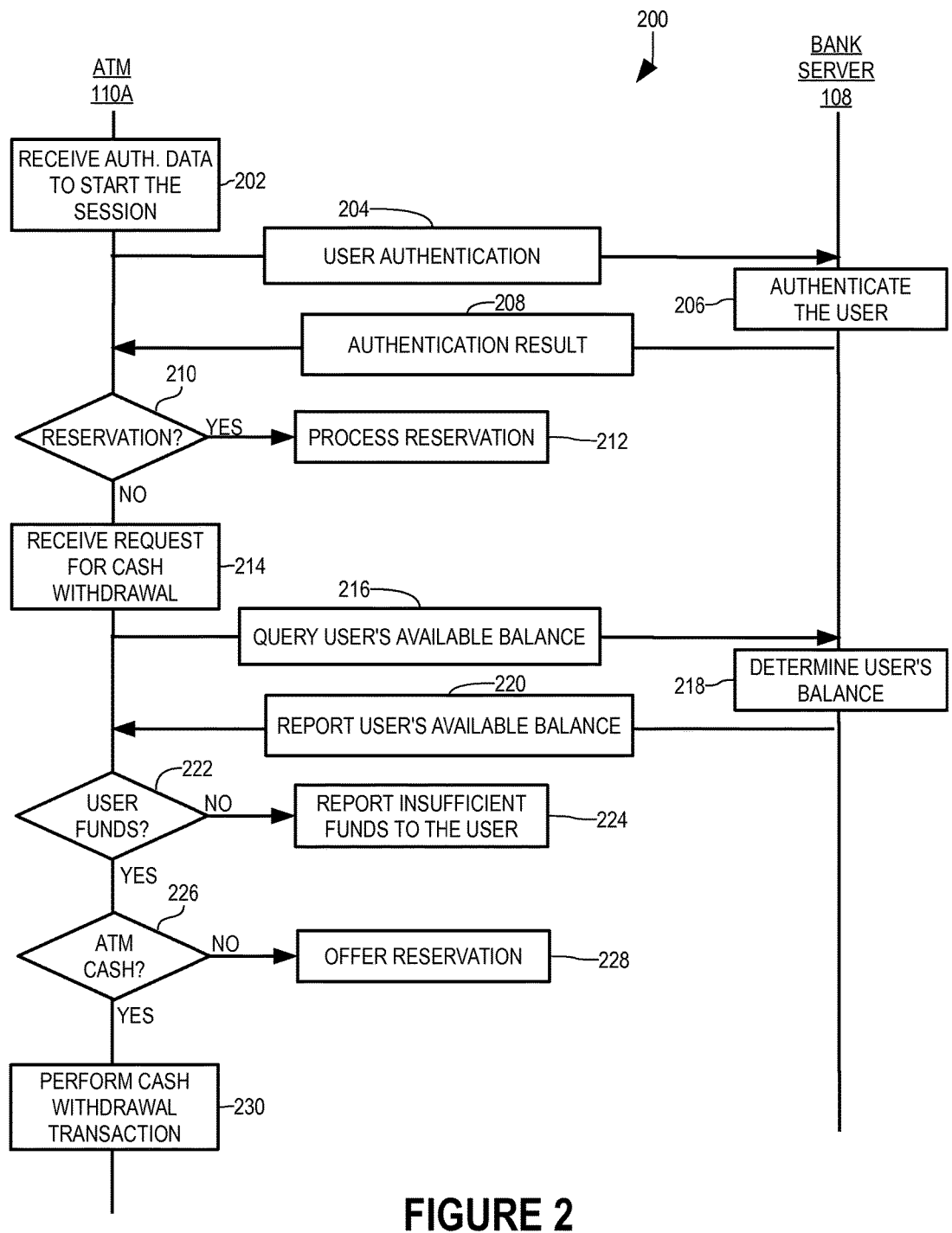
FIG. 2 is a transaction flow diagram illustrating one embodiment according to the invention of a method by which the bank server computer of FIG. 1 coordinates a cash reservation offer and processing of the cash reservation.

In step 502, ATM 110A displays an offer to process the reservation found in test step 210 (FIG. 2). In step 504, ATM 110A represents data accepting the offer generated by the user through conventional user interface techniques.

In steps 506-514, ATM 110A verifies that the user has sufficient funds in the specified in account 804 (FIG. 8) to complete the withdrawal transaction in the manner described above with respect to steps 216-224 (FIG. 2). Thus, in case the user has made a purchase or made a withdrawal between creation of the reservation in step 228 and processing the reservation in step 212, the sufficiency of the bank account for the withdrawal is re-checked in steps 506-514 (FIG. 5).

In step 516, ATM 110A dispenses cash to the user in the reserved amount in the manner described above with respect to step 302 (FIG. 3). In step 518 (FIG. 5), ATM 110A reports completion of the withdrawal transaction to bank server 108 in the manner described above with respect to step 304 (FIG. 3). In step 520 (FIG. 5), bank server 108 deducts the dispensed amount of cash from the user's bank account and records the amount of cash on hand in ATM 110A in the manner described above with respect to step 306 (FIG. 3).

In step 522 (FIG. 5), ATM 110A marks the reservation as completed, e.g., by storing data in status 812 (FIG. 8) indicating that the reservation is completed. After step 522, processing according to transaction flow diagram 212 completes. After step 212 (FIG. 2), processing according to transaction flow diagram 200 completes.

Figure 9:
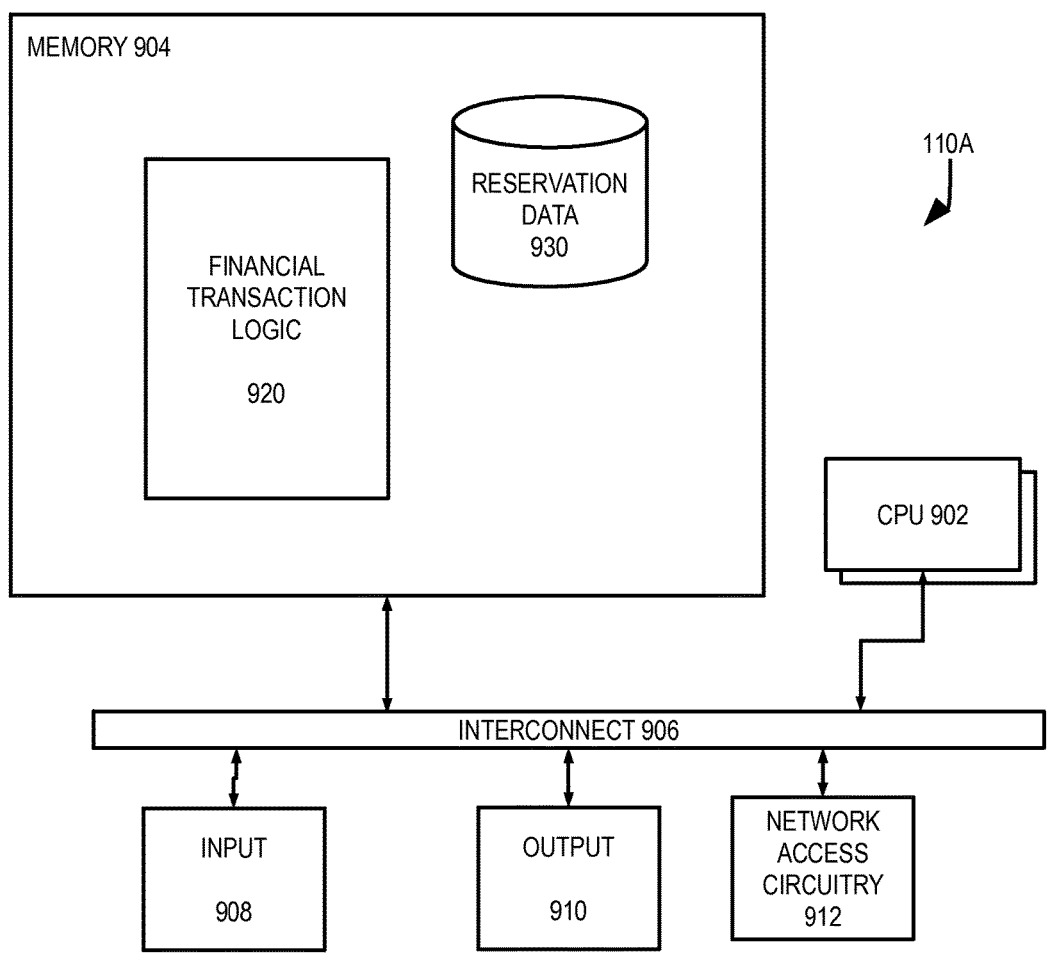
FIG. 9 is a block diagram showing an ATM of FIG. 1 in greater detail.

ATM 110A is shown in greater detail in FIG. 9.

ATM 110A includes one or more microprocessors 902 (collectively referred to as CPU 902) that retrieve data and/or instructions from memory 904 and execute retrieved instructions in a conventional manner. Memory 904 can include generally any computer-readable medium including, for example, persistent memory such as magnetic and/or optical disks, ROM, and PROM and volatile memory such as RAM.

CPU 902 and memory 904 are connected to one another through a conventional interconnect 906, which is a bus in this illustrative embodiment and which connects CPU 902 and memory 904 to one or more input devices 908, output devices 910, and network access circuitry 912. Input devices 908 can include, for example, a keyboard, a keypad, a touch-sensitive screen, a mouse, a microphone, and one or more cameras. Output devices 910 can include, for example, a display—such as a liquid crystal display (LCD)—and one or more loudspeakers or audio output jacks. Network access circuitry 912 sends and receives data through computer networks such as WAN 104 (FIG. 1), for example.

A number of components of ATM 110A are stored in memory 904. In particular, financial transaction logic 920 is all or part of one or more computer processes executing within CPU 902 from memory 904 in this illustrative embodiment but can also be implemented using digital logic circuitry. As used herein, "logic" refers to (i) logic implemented as computer instructions and/or data within one or more computer processes and/or (ii) logic implemented in electronic circuitry. Reservation data 930 is data stored persistently in memory 904.

Figure 8:
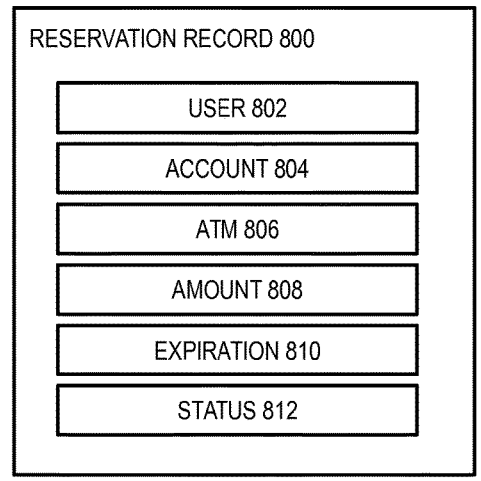
FIG. 8 is a block diagram of a reservation record that the bank server of FIG. 1 uses to coordinate a cash reservation offer and processing of the cash reservation in accordance with one embodiment of the invention.

Financial transaction logic 920 causes ATM 110A to perform the various steps described herein. Reservation data 930 stores reservation records such as reservation record 800 (FIG. 8). Reservation data can be organized as all or part of one or more databases.

Figure 10:
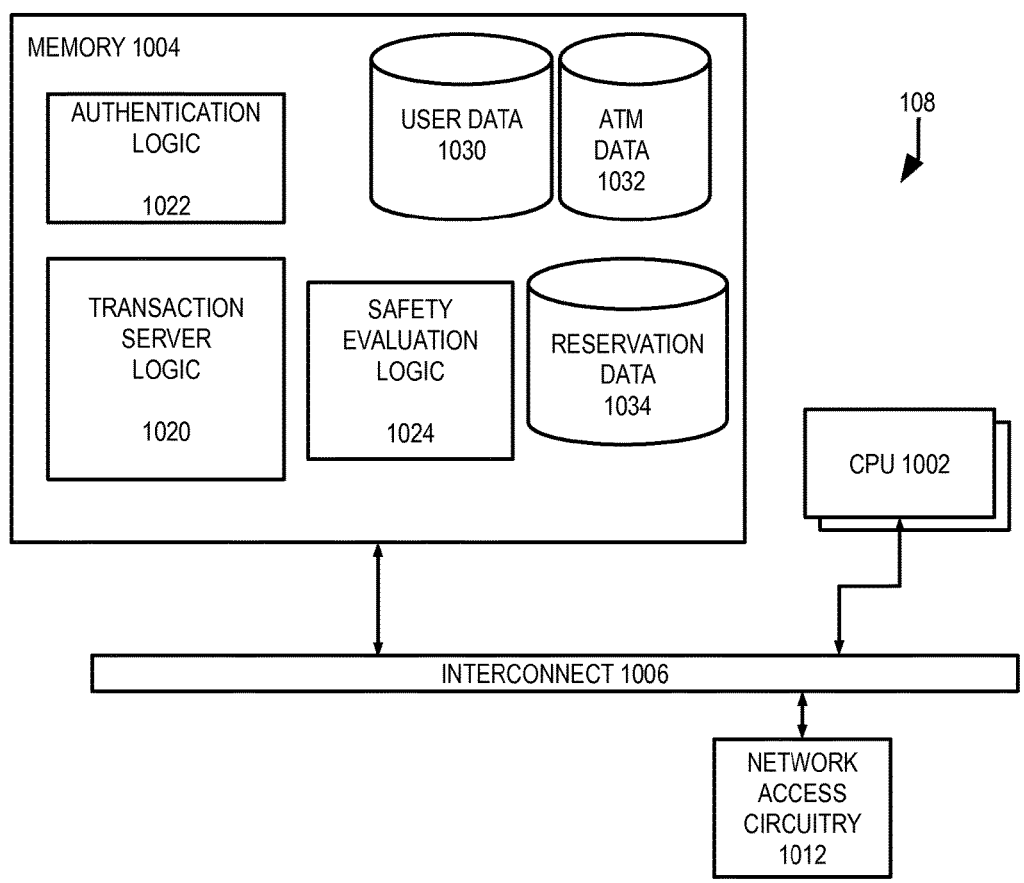
FIG. 10 is a block diagram showing the bank server of FIG. 1 in greater detail.

Bank server 108 is shown in greater detail in FIG. 10. Bank server 108 includes one or more processors 1002, a memory 1004, an interconnect 1006, and network access circuitry 1012 that are directly analogous to CPU 902 (FIG. 9), memory 904, interconnect 906, and network access circuitry 912, respectively. Since bank server 108 primarily serves requests received through network access circuitry 1012 (FIG. 10), bank server may not include input and output devices but might include input and output devices for the convenience of administrators of bank server 108.

A number of components of bank server 108 are stored in memory 1004. In particular, transaction server logic 1020, authentication logic 1022, and safety evaluation logic 1024 are each all or part of one or more computer processes executing within CPU 1002 from memory 1004 in this illustrative embodiment but can also be implemented using digital logic circuitry. User data 1030, ATM data 1032, and reservation data 1034 are data stored persistently in memory 1004.

Figure 6:
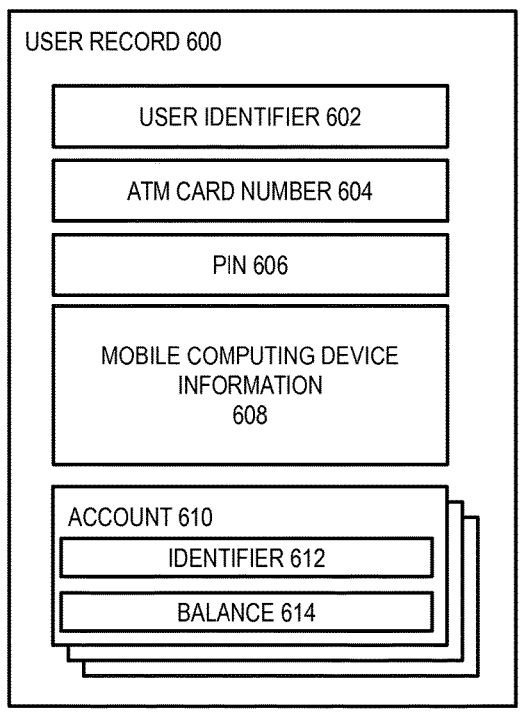
FIG. 6 is a block diagram of a user record that the bank server of FIG. 1 uses to coordinate a cash reservation offer and processing of the cash reservation in accordance with one embodiment of the invention.

In particular, transaction server logic 1020, authentication logic 1022, and safety evaluation logic 1024 collectively form automatic teller machine inventory management logic that causes bank server 108 to perform the steps described herein. In addition, while a single bank server 108 is described herein, it should be appreciate that the logic of bank server 108 can be distributed across multiple servers that cooperate to perform the steps described herein. User data 1030 stores user records such as user record 600 (FIG. 6). ATM data 1032 (FIG. 10) stores ATM records such as ATM record 700 (FIG. 7). Reservation data 1034 (FIG. 10) stores reservation records such as reservation record 800 (FIG. 8). User data 1030 (FIG. 10), ATM data 1032, and reservation data 1034 can each be organized as all or part of one or more databases.

Figure 11:
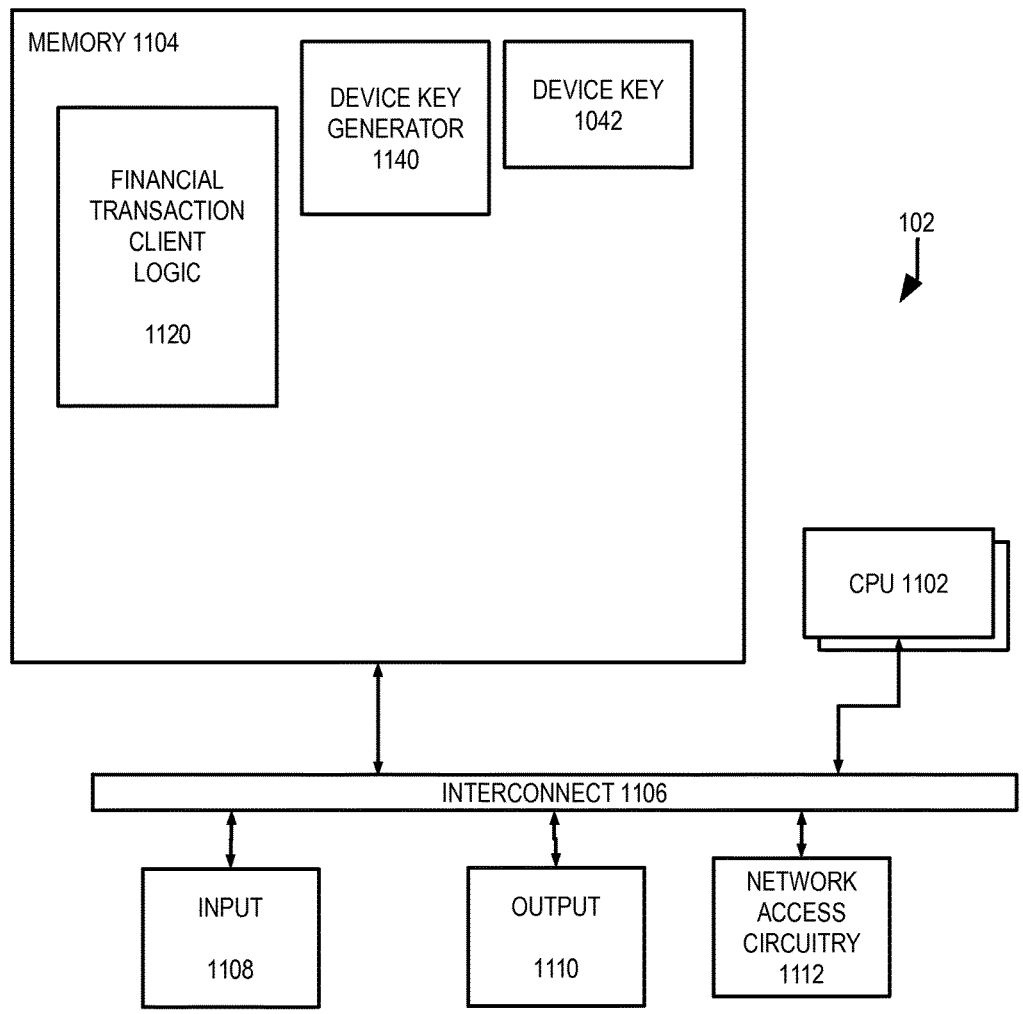
FIG. 11 is a block diagram showing the mobile computing device of FIG. 1 in greater detail.

Mobile computing device 102 can be generally any mobile computing device such as a smart phone, tablet computer, or laptop computer and is shown in greater detail in FIG. 11. Mobile computing device 102 includes one or more processors 1102, a memory 1104, an interconnect 1106, input devices 1108, output devices 1110, and network access circuitry 1112 that are directly analogous to CPU 902 (FIG. 9), memory 904, interconnect 906, input devices 908, output devices 910, and network access circuitry 912, respectively.

A number of components of mobile computing device 102 are stored in memory 1104. In particular, financial transaction client logic 1120 and device key generator 1140 are each all or part of one or more computer processes executing within CPU 1102 from memory 1104 in this illustrative embodiment but can also be implemented using digital logic circuitry. Device key 1042 is data stored in memory 1104.

Financial transaction client logic 1120 and device key generator 1140 cause mobile computing device 102 to perform the steps described herein. The particular functionality of device key generator 1140 is to generate device key 1042 in response to a device key challenge as described more completely below. The remainder of the functionality of mobile computing device 102 is controlled by financial transaction client logic 1120, which can be a web browser in some embodiments.

Figure 12:
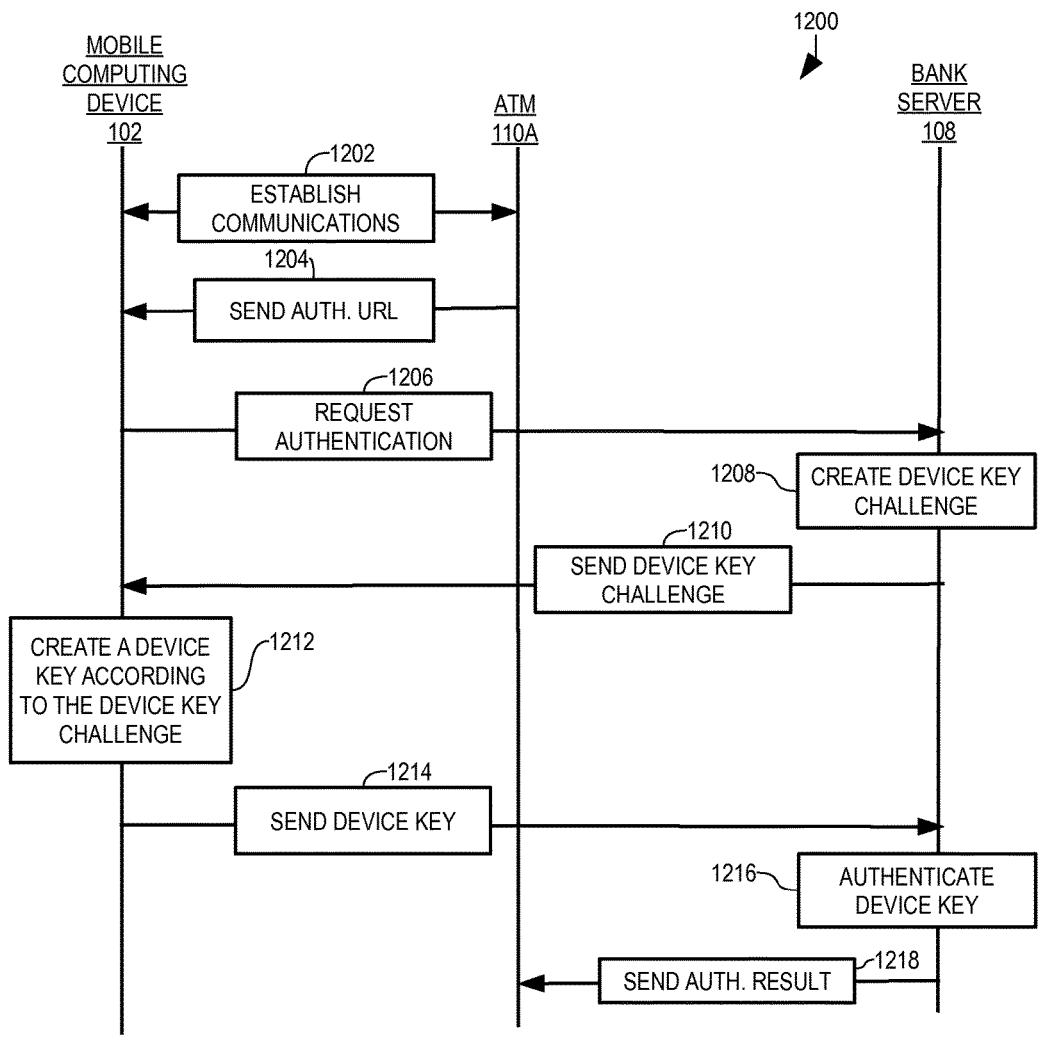
FIG. 12 is a transaction flow diagram illustrating one embodiment according to the invention of a method by which the bank server computer of FIG. 1 authenticates the user through the mobile computing device of FIG. 1.

The manner in which mobile computing device 102 is authenticated to enable its user to interact with ATM 110A in the manner described above is illustrated in transaction flow diagram 1200 (FIG. 12).

In step 1202, mobile computing device 102 and ATM 110A establish communications with one another. There are a number of ways this can be accomplished. Some communications require close proximity between devices, such as near field communications (NFC) and bluetooth communications. Establishing this type of connection makes it unlikely that mobile communications device 102 is communicating with any ATM other than the one that the user is standing before. Mobile computing device 102 and ATM 110A can establish communications through a LAN used by only ATM 110A. ATM 110A can also be marked with or display a unique identifier of ATM 110A that can be manually entered into mobile computing device 102 and provided to financial transaction client logic 1120 (FIG. 11) such that financial transaction client logic 1120 can establish contact with ATM 110A through WAN 104 (FIG. 1). In yet another embodiment, the user can indicate a desire to connect to ATM 110A through a user interface of ATM 110A, e.g., by pushing a button to so indicate.

In step 1204 (FIG. 12), ATM 110A sends to mobile computing device 102 an authentication URL by which mobile computing device 102 is to interact with bank server 108 for authentication. The authentication URL includes data identifying ATM 110A as the ATM with which the user of mobile computing device 102 is interacting. In the embodiment in which the connection between mobile computing device 102 and ATM 110A is established by the user merely pushing a button on ATM 110A indicating a request to be authenticated by mobile computing device 102, ATM 110A displays the authentication URL to be entered into mobile computing device 102. In a particularly convenient embodiment, the authentication URL is displayed in a computer-readable format such as a Quick Response (QR) code or barcode and mobile computing device 102 can capture the QR code optically and identify the authentication URL from the captured image.

In step 1206, mobile computing device 102 uses the authentication URL to request authentication by bank server 108. In step 1208, bank server 108 creates a device key challenge that specifies all or part of one or more attributes of mobile computing device 102 stored in mobile computing device information 608 (FIG. 6). In a registration process performed before mobile computing device 102 can be used for authentication, mobile computing device 102 sends to bank server 108 a number of attributes of mobile computing device 102 for storage in mobile computing device information 608 and for subsequent use in authentication. Preferably, the attributes are those likely to be unique to mobile computing device 102 and difficult to spoof. Examples include serial numbers, model numbers, and versions of components of mobile device such as processors, storage media, etc.

The device key challenge specifies the particular attributes to be included in the device key, which parts of which attributes, and the particular manner in which the attribute information is to be combined, typically using cryptographically secure hashing. The device key challenge is different for each authentication session. Thus, if an unscrupulous person intercepts a device key, the device key cannot be used to authentication in a subsequent authentication session in response to a different device key challenge. In addition, by including less than all attributes in the device key challenge, interception of numerous device key challenges and responsive device keys would be unlikely to reveal all, or even a significant amount, of the attribute data even if a party were able to recover the attribute information from a device key.

In step 1210 (FIG. 12), bank server 108 sends the device key challenge to mobile computing device 102. In step 1212, financial transaction client logic 1120 (FIG. 11) causes device key generator 1140 to generate device key 1142 in the manner specified in the device key challenge. In step 1214 (FIG. 12), mobile computing device 102 sends device key 1142 to bank server 108.

In step 1216, bank server 108 authenticates the device key by generating a test device key from mobile computing device information 608 (FIG. 6) and comparing the device key from mobile computing device 102 to the test device key. Device key challenges, device keys, and authentication thereof are described more completely in US 2014/0068738 and that description is incorporated herein by reference.

In step 1218 (FIG. 12), bank server 108 sends a report of the results of the authentication to ATM 110A. If authentication is successful, bank server 108 determines that the user record 600 (FIG. 6) that includes the mobile computing device information 608 from which the received device key was generated and therefore identifies the user of mobile computing device 102. If so, bank server 108 identifies the user in the report send in step 1208.

After step 1208, processing by ATM 110A continues with test step 210 (FIG. 2) if the user was successfully authenticated through mobile computing device 102.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for managing cash inventories of two or more automatic teller machines, the method comprising:
receiving reservation request data from a first one of the automatic teller machines, wherein the reservation request data represents a request to reserve cash and specifies a user for whom the cash is reserved and an amount of cash to be reserved for the user;

identifying one or more other automatic teller machines that (i) have respective locations in proximity to a location of the first automatic teller machine and (ii) store at least the amount of cash to be reserved for the user;

sending reservation option data that identifies the other automatic teller machines and the respective locations of the other automatic teller machines;

receiving reservation selection data that (i) represents a selection of a selected one of the other automatic teller machines made by the user, (ii) identifies the user, and (iii) specifies a confirmed amount of cash to be reserved for the user; and sending reservation data to the selected other automated teller machine that (i) represents a reservation of cash managed by the selected other automatic teller machine, (ii) identifies the user, and (iii) specifies a confirmed amount of cash to be reserved for the user, wherein the sending of the reservation data causes the selected other automatic teller machine to refuse to complete cash withdrawals for users other than the user that would cause the amount of cash on hand at selected other automatic teller machine to be less than the confirmed amount of cash until the selected other automatic teller machine has dispensed the confirmed amount of cash to the user.

2. The method of claim 1 further comprising:
determining a relative safety of the other automatic teller machines at their respective locations;
wherein the reservation option data includes data representing the relative safety of each of the other automatic teller machines.

3. The method of claim 1 wherein sending the reservation option data to the first automatic teller machine causes the first automatic teller machine to report the other automatic teller machines and their respective locations to the user.

4. The method of claim 1 wherein the reservation data includes expiration data that specifies a time after which the selected other teller machine no longer reserves the confirmed amount of cash for the user.

5. The method of claim 1 further comprising:
authenticating the user by:
sending a device key challenge to a mobile computing device used by the user, wherein the device key challenge specifies one or more attributes of the mobile computing device and a manner in which data representing the attributes is to be combined to form a device key;
receiving the device key from the mobile computing device; and
determining whether the device key is the result combining the attributes of the mobile computing device in the manner specified by the device key challenge.

6. A non-transitory computer readable medium useful in association with a computer which includes one or more processors and a memory, the computer readable medium including computer instructions which are configured to cause the computer, by execution of the computer instructions in the one or more processors from the memory, to manage cash inventories of two or more automatic teller machines by at least:
receiving reservation request data from a first one of the automatic teller machines, wherein the reservation request data represents a request to reserve cash and specifies a user for whom the cash is reserved and an amount of cash to be reserved for the user;

identifying one or more other automatic teller machines that (i) have respective locations in proximity to a location of the first automatic teller machine and (ii) store at least the amount of cash to be reserved for the user;

sending reservation option data that identifies the other automatic teller machines and the respective locations of the other automatic teller machines;

receiving reservation selection data that (i) represents a selection of a selected one of the other automatic teller machines made by the user, (ii) identifies the user, and (iii) specifies a confirmed amount of cash to be reserved for the user; and sending reservation data to the selected other automated teller machine that (i) represents a reservation of cash managed by the selected other automatic teller machine, (ii) identifies the user, and (iii) specifies a confirmed amount of cash to be reserved for the user, wherein the sending of the reservation data causes the selected other automatic teller machine to refuse to complete cash withdrawals for users other than the user that would cause the amount of cash on hand at selected other automatic teller machine to be less than the confirmed amount of cash until the selected other automatic teller machine has dispensed the confirmed amount of cash to the user.

7. The computer readable medium of claim 6 wherein the computer instructions are configured to cause the computer to manage cash inventories of two or more automatic teller machines by at least also:
determining a relative safety of the other automatic teller machines at their respective locations;
wherein the reservation option data includes data representing the relative safety of each of the other automatic teller machines.

8. The computer readable medium of claim 6 wherein sending the reservation option data to the first automatic teller machine causes the first automatic teller machine to report the other automatic teller machines and their respective locations to the user.

9. The computer readable medium of claim 6 wherein the reservation data includes expiration data that specifies a time after which the selected other teller machine no longer reserves the confirmed amount of cash for the user.

10. The computer readable medium of claim 6 wherein the computer instructions are configured to cause the computer to manage cash inventories of two or more automatic teller machines by at least also:
authenticating the user by:
sending a device key challenge to a mobile computing device used by the user, wherein the device key challenge specifies one or more attributes of the mobile computing device and a manner in which data representing the attributes is to be combined to form a device key;
receiving the device key from the mobile computing device; and
determining whether the device key is the result combining the attributes of the mobile computing device in the manner specified by the device key challenge.

11. A computer system comprising:
at least one processor;
a computer readable medium that is operatively coupled to the processor;
network access circuitry that is operatively coupled to the processor; and automatic teller machine inventory management logic (i) that executes in the processor from the computer readable medium and (ii) that, when executed by the processor, causes the computer to manage cash inventories of two or more automatic teller machines by at least:

receiving reservation request data from a first one of the automatic teller machines, wherein the reservation request data represents a request to reserve cash and specifies a user for whom the cash is reserved and an amount of cash to be reserved for the user;

identifying one or more other automatic teller machines that (i) have respective locations in proximity to a location of the first automatic teller machine and (ii) store at least the amount of cash to be reserved for the user;

sending reservation option data that identifies the other automatic teller machines and the respective locations of the other automatic teller machines;

receiving reservation selection data that (i) represents a selection of a selected one of the other automatic teller machines made by the user, (ii) identifies the user, and (iii) specifies a confirmed amount of cash to be reserved for the user; and sending reservation data to the selected other automated teller machine that (i) represents a reservation of cash managed by the selected other automatic teller machine, (ii) identifies the user, and (iii) specifies a confirmed amount of cash to be reserved for the user, wherein the sending of the reservation data causes the selected other automatic teller machine to refuse to complete cash withdrawals for users other than the user that would cause the amount of cash on hand at selected other automatic teller machine to be less than the confirmed amount of cash until the selected other automatic teller machine has dispensed the confirmed amount of cash to the user.

12. The computer system of claim 11 wherein the automatic teller machine inventory management logic causes the computer to manage cash inventories of two or more automatic teller machines by at least also:
determining a relative safety of the other automatic teller machines at their respective locations;
wherein the reservation option data includes data representing the relative safety of each of the other automatic teller machines.

13. The computer system of claim 11 wherein sending the reservation option data to the first automatic teller machine causes the first automatic teller machine to report the other automatic teller machines and their respective locations to the user.

14. The computer system of claim 11 wherein the reservation data includes expiration data that specifies a time after which the selected other teller machine no longer reserves the confirmed amount of cash for the user.

15. The computer system of claim 11 wherein the automatic teller machine inventory management logic causes the computer to manage cash inventories of two or more automatic teller machines by at least also:
authenticating the user by:
sending a device key challenge to a mobile computing device used by the user, wherein the device key challenge specifies one or more attributes of the mobile computing device and a manner in which data representing the attributes is to be combined to form a device key;
receiving the device key from the mobile computing device; and
determining whether the device key is the result combining the attributes of the mobile computing device in the manner specified by the device key challenge.

* * * * *